Feb. 13, 1945.   H. S. JONES   2,369,571
AIR CONTROL INSTRUMENT
Filed July 5, 1940   3 Sheets-Sheet 1

INVENTOR.
HARRY S. JONES
BY C. B. Spangenberg
ATTORNEY

Feb. 13, 1945.   H. S. JONES   2,369,571
AIR CONTROL INSTRUMENT
Filed July 5, 1940   3 Sheets-Sheet 2
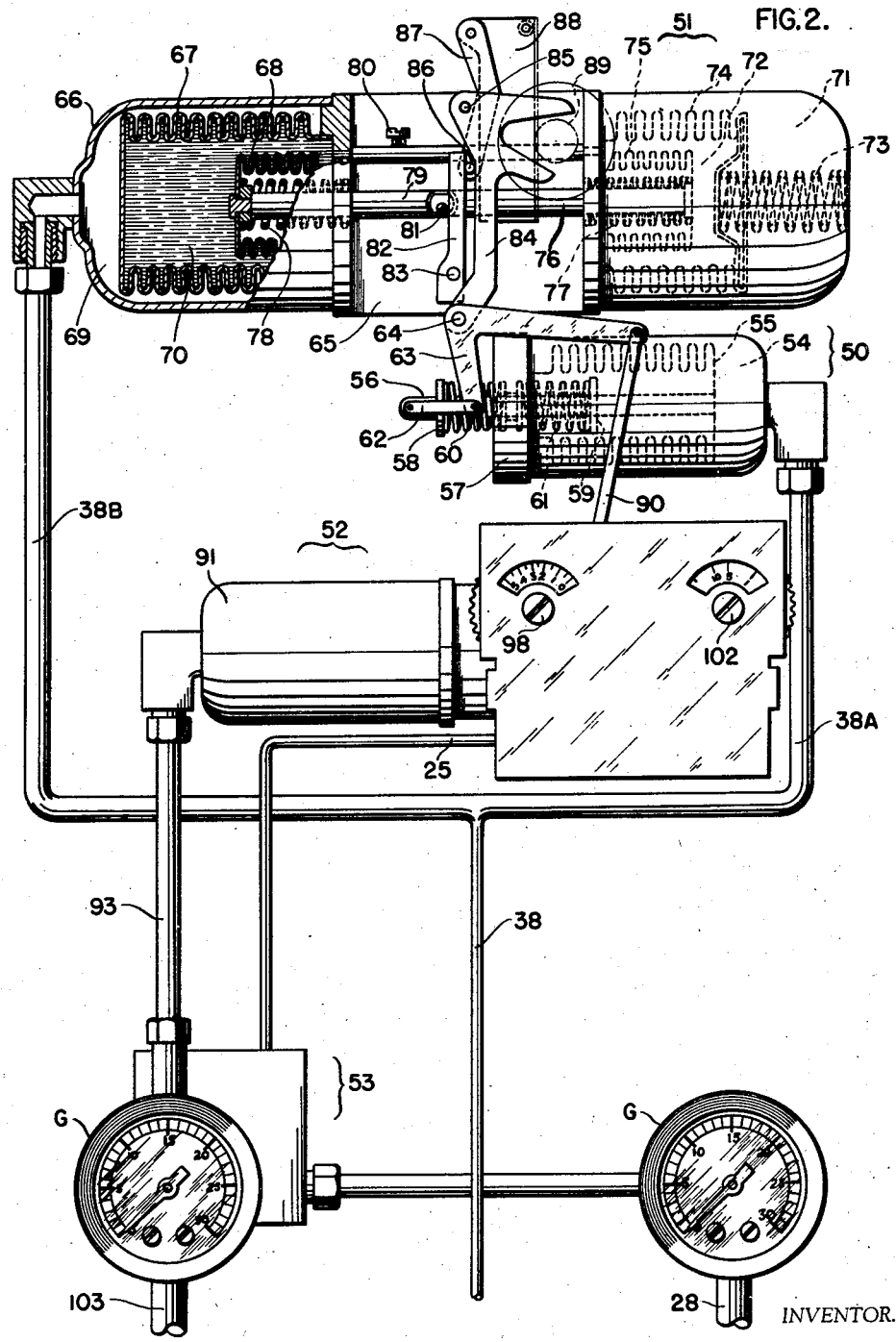
INVENTOR.
HARRY S. JONES
BY C. B. Spangenberg
ATTORNEY Feb. 13, 1945.   H. S. JONES   2,369,571
AIR CONTROL INSTRUMENT
Filed July 5, 1940   3 Sheets-Sheet 3
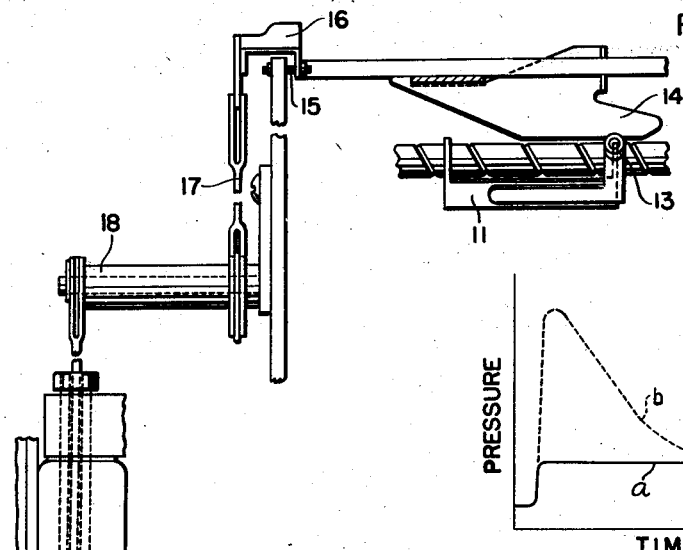
FIG. 4.
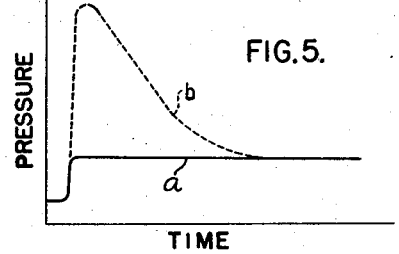
FIG. 5.
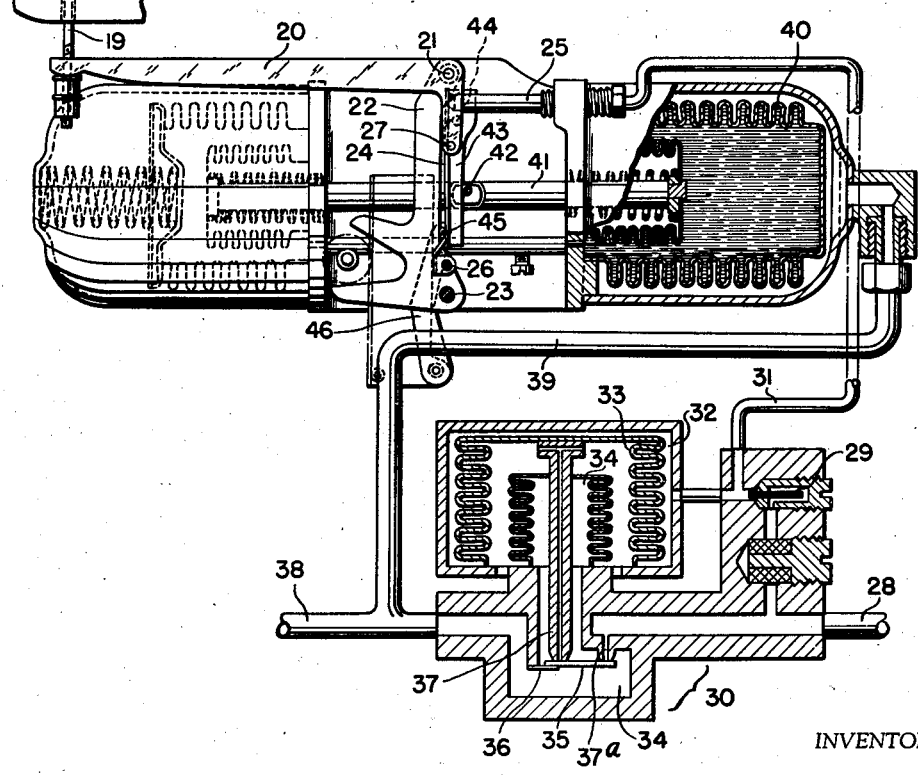
INVENTOR.
HARRY S. JONES
BY C. B. Spangenberg
ATTORNEY Patented Feb. 13, 1945

2,369,571

UNITED STATES PATENT OFFICE 2,369,571

AIR CONTROL INSTRUMENT

Harry S. Jones, Philadelphia, Pa., assignor to The Brown Instrument Company, Philadelphia, Pa., a corporation of Pennsylvania Application July 5, 1940, Serial No. 344,185

2 Claims. (Cl. 137—153)

The present invention relates to the control of a variable condition by means of a pneumatic instrument that is responsive to both the change of the condition from a normal value thereof and to the rate at which the condition is changing. For purposes of illustration the condition described herein which is being controlled is temperature, but it will be readily apparent to those skilled in the art that the instrument is adapted equally as well to control other measurable conditions such as, for example, pressure and flow.

It has, in the past, been difficult to maintain the value of the temperature of some mediums at a constant value because of the process lag. That is, the time that is required for a change in the temperature to take place as a result of a change in the heat supply. The slower the value of the temperature changes the more difficult it has been to maintain control thereof and the longer it took to return the temperature toward normal.

The invention herein is an improvement in instruments of the type that are responsive to the rate at which the temperature is changing as well as to the amount and direction of the change. The instrument is simple in construction and easy to install in systems that are already set up. The instrument is an air control instrument provided with a number of adjustments, the use of which permit the instrument to be applied to a large number of control applications. These adjustments may be so arranged that the output pressure of the instrument will vary for a given input pressure and the range of the output pressure can be varied for a given range of input pressure. The output pressure is then applied to a control valve.

It is an object of my invention to provide improvements in rate responsive control instruments of the type that supply a control impulse which is proportional to the rate at which the temperature being controlled is changing to thereby quickly counteract the change and return the temperature to normal.

It is a particular object of the invention to have a pneumatic instrument of the type mentioned that has on it adjustments to vary the "span" and the "zero" of the instrument. In other words to provide an instrument in which the output pressure may be varied for a given input pressure.

It is a further object of my invention to provide improvements in instruments which permit the use of a much narrower throttling range, or range of variation of the temperature through which the control valve moves from opened to closed positions, than is usually permissible. In a process that has an appreciable lag the instrument of my invention permits the control system to anticipate and cancel a considerable part of this lag. The use of a rate response results in a narrower throttling range without encountering hunting of the controlled temperature.

It is a further object of my invention to provide improvements in measuring instruments of the type that are responsive to the rate of change of a variable condition to be controlled, which instrument may be added to existing control installations to improve the quality of the control obtained thereby.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

Fig. 2 is a view of the component parts of the rate responsive instrument;

Fig. 4 is a detail view of a portion of the primary control instrument of the system of Figure 1; and Fig. 5 shows two curves that illustrate the operation of the instrument.

Figure 1:
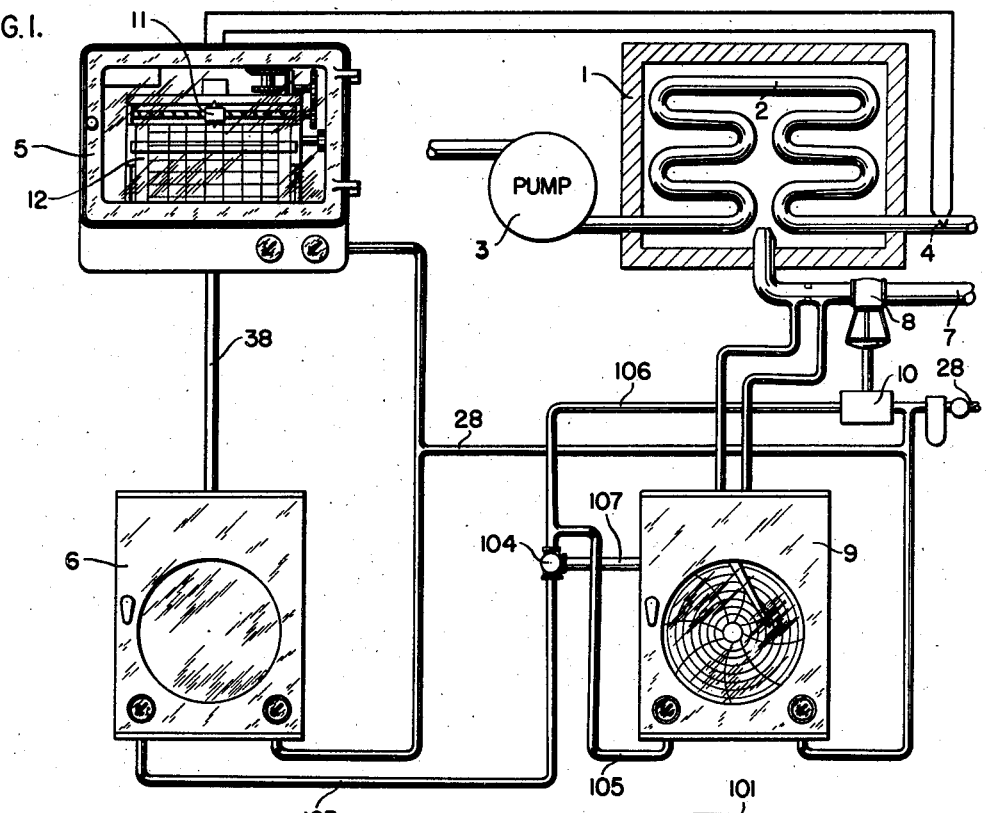
Fig. 1 is a view of a control system incorporating the instrument of my invention showing the control of the outlet temperature of the oil in a cracking still.

Referring first to Figure 1, there is shown a furnace 1 that is used to heat oil flowing therethrough in pipe 2. This oil is forced through the pipe or tube 2 by a constant speed pump 3. The process in which the hot oil is used requires that the temperature at which it leaves the furnace be maintained constant and this is accomplished by varying the supply of fuel to the furnace. It is customary to control the supply of fuel, generally oil, by means of any suitable type of flow controller and to vary the control point of this controller in accordance with the exit temperature of the oil. Due to the large volume of oil flowing through the pipe 2 and the large diameter of this pipe and to changes in the oil inlet temperature, there has been considerable lag between the time that a change in the temperature of the oil was detected and the time that this change was corrected. If, however, the control instrument is capable of taking into account the rate at which the temperature is changing, as well as the fact that a temperature change has occurred, suitable corrective action may be taken to more quickly return the oil temperature to normal.

The temperature of the oil as it leaves the furnace 1 is measured by a thermocouple 4 placed in the pipe 2, which measurement is recorded by an air control potentiometer indicated generally at 5. This potentiometer varies the pressure of a supply of air in accordance with this measurement, and applies the variable pressure to the rate responsive instrument indicated generally at 6. Fuel is supplied to the furnace 1 through a pipe 7 having an air actuated valve in it. The flow of fuel is controlled by a flow controller indicated generally at 9 which controller supplies air under varying pressure to a valve positioner 10 which in turn controls the pressure of air supplied to the diaphragm of valve 8. The rate responsive instrument 6 may be used to supply air under varying pressure either directly to the valve positioner or, more generally, may be used to adjust the control point of the flow controller 9. It will, therefore, be seen that the fuel is controlled by the instrument 9 to maintain a given flow thereof. This flow is then changed in response to changes in the outlet temperature of the oil, as measured by the instrument 5, through the intermediary of the instrument 6 which superimposes a rate component upon the value component of instrument 5.

The potentiometer control instrument is of a type in wide commercial use and known as the "Brown Potentiometer." The details of the potentiometer structure form no part of the invention herein since they are shown and claimed in Harrison et al. Patent Number 2,150,502, and Harrison Patent Number 1,946,280. It is sufficient to say that a pen carriage 11 moves back and forth across a chart 12 to make a record thereon in response to measurements made by the thermocouple 4. Control effects from the potentiometer are produced as a result of the mechanical interaction of a roller 13 on the pen carriage 11 (Fig. 4) and a control table part 14. In the arrangement shown in Fig. 4, the angular adjustment of the part 14 about its pivotal axis 15, operatively adjusts the flapper valve of an air controller element included in the instrument 5, through connections of the character disclosed and claimed in the patent of Coleman B. Moore, Number 2,093,119, granted September 14, 1937. Those connections comprise a part 16 connected to the part 14 to share the oscillatory movements of the latter, a link 17 connecting the part 16 to one arm of a rocking element 18, and a link 19 connecting a second arm of the element 18 to the flapper valve actuating element 20 of the air controller.

The air controller shown in Fig. 4, is of a form fully disclosed in the Coleman B. Moore Patent Number 2,125,081, granted July 26, 1938, and now in extensive commercial use. The actuating member 20 is a lever pivoted at 21 to an adjustable fulcrum member 22, in the form of a lever having a stationary fulcrum pivot 23. The movements of the lever 22 move a flapper valve 24 away from, or permit it to approach a nozzle or bleed orifice member 25. The flapper valve is mounted on a stationary pivot 26, and is biased for movement in the direction in which it approaches and restricts the discharge through nozzle 25. The lever 20 acts on the flapper 24 through a pin 27 carried by a depending arm of the lever.

The nozzle 25 receives air from a pipe 28, supplying air at a suitable and approximately constant pressure, through a restricted passage formed by a small bore pipe 29, included in a pilot valve mechanism 30, so that the pressure in the nozzle 25, which constitutes the primary control pressure of the control apparatus, increases and decreases as the flapper valve 24 moves toward and away from the nozzle. The primary control pressure is transmitted by a pipe 31 to a chamber 32 of the pilot valve mechanism. One wall 33 of that chamber 32 is movable, and with a second and smaller bellows, separates the chamber 32 from a second pilot valve chamber 34. The pressure in the latter is produced by a valve 35 that is fastened to a spring member 36 which acts as a hinge. As the pressure in chamber 32 increases the bellows 33 is collapsed and this acts through a nozzle 37 to move the valve 35 away from an inlet nozzle 37a to increase the pressure in chamber 34. If the pressure in 32 decreases the bellows 33 will expand and move the nozzle 37 away from valve 35 and thereby let chamber 34 communicate with the atmosphere to reduce the pressure therein. The pressure in the chamber 34 is thus maintained in constant proportion to the primary control pressure in the chamber 32, and constitutes the ultimate control pressure of the apparatus.

Said ultimate control pressure is transmitted by a pipe 38 to the instrument 6. The ultimate control pressure is also transmitted by a branch pipe 39 to mechanism 40, forming a part of the control apparatus, and adapted, following and as a result of each initial change in the ultimate control pressure, effected through link 19, to give the lever 22 an initial follow-up adjustment, and a delayed compensating adjustment. The follow-up adjustment neutralizes a portion of the initial adjustment of the flapper valve 24 effected by the link 19. The delayed compensating adjustment slowly neutralizes more or less of the effect of the preceding follow-up adjustment.

The mechanism 40 comprises bellows elements, two of which are connected by a connected rod 41, which carries a projection 42. The latter acts on lever 22 through a lever 43 pivoted at 44, and a pin 45 interposed between the levers 22 and 43. The pin 45 is supported by a member 46 adjustable to vary the leverage with which the lever 43 acts on the lever 22. The latter is biased for movement in the clockwise direction, as seen in Fig. 4. Details of the construction and operation of the mechanism 40, not specifically referred to herein, will be understood by those skilled in the art from the drawings, and need not be described herein, particularly as that mechanism is not only fully disclosed in Patent Number 2,125,081, issued to Coleman B. Moore, but is in extensive use.

The air supply from the control instrument just described will vary as the condition varies. If the change in temperature is large the variation in the air pressure is large. This pressure is applied through pipe 38 to the rate responsive instrument 6, which serves as a pneumatic relay to apply a pressure to the final control unit that is proportional to both the change in the temperature and its rate of change.

The mechanism of the instrument 6 is shown in detail in Figures 2 and 3, and comprises generally of four main assembly units, namely, the input unit 50, the rate responsive unit 51, the output unit 52 and the pilot valve unit 53 that is identical with the pilot valve 30 that has been described in connection with Figure 4.

Air from the pipe 38 enters the instrument 6 and is applied through branch 38A to the interior of a chamber 54 in the input unit. This chamber is provided with a flexible wall 55 that may take the form of a bellows and which has a rod 56 attached to its inner end. This rod extends through an opening in a supporting member 57 and is provided with a pair of enlargements 58 and 59 between each of which and the member 57 is a spring 60 and 61 respectively. These springs tend to maintain the bellows at some predetermined length which will be directly varied in accordance with the pressure applied within the chamber 54. The outer end of the rod 56 is connected by a link 62 with one arm of a bellcrank lever 63 that is pivoted at 64 on a part of the rate responsive unit. It will, therefore, be seen that an increase in pressure in pipe 38 will produce a clockwise movement of bellcrank 63 around 64.

Air from pipe 38 also passes through a branch 38B to the rate responsive unit. This unit comprises a supporting member 65 upon the left side of which is attached a cup-shaped member 66 and two bellows 67 and 68 that serve to form a pair of chambers 69 and 70. To the right side of the support is a similar arrangement forming chambers 71 and 72, the former of which is in free communication with the atmosphere and is provided with a spring 73 that serves to put an initial compressive forces on an outer bellows 74. The right-hand inner bellows 75 is connected by a rod 76 to the left-hand inner bellows 68 so that these bellows are constrained to move together and they are urged to a predetermined length by springs 77 and 78, respectively.

The chambers 70 and 72 are filled with an incompressible liquid and are in communication through a pipe 79 that is provided with an adjustable valve 80. A change in pressure in the chamber 69 will then be transmitted through the liquid in chamber 70 and connecting rod 76 to chamber 72. Since chamber 71 is in communication with the atmosphere the pressures in chambers 70 and 72 will be different but will eventually be equalized by the action of springs 77 and 78 on their respective bellows. This equalization will cause the rod 76 to return to its original position and will take place over a period of time depending upon the opening of valve 80.

Movement of the rod 76 serves to shift the pivot point 64 of the bellcrank 63 by means of the engagement between a projection 81 on the rod 76 and a lever 82 that is pivoted at 83. As the lever 82 moves it moves a lever 84, upon the lower end of which is mounted the pivot 64, around its pivot 85 through the intermediary of a pin 85. The lever 84 is biased clockwise in Figure 2 to maintain engagement between this lever, pin 86, lever 82 and pin 81; thus preventing any lost motion. The amount of movement imparted to pivot 64 for a given movement of pin 81 can be varied by moving pin 86 up and down between levers 82 and 84 and thereby changing their leverage. This is accomplished by having the pin 86 mounted on the lower end of a member 87 that is in turn attached to a plate 88. This plate is provided with ratchet teeth on one face that mesh with a pinion 89 which may be rotated to raise and lower the pin 86.

From the above it will be seen that an increase in the pressure in chamber 70 will cause an immediate movement of pivot point 64 to the right an amount proportional to the pressure change and the position of pin 86. This movement will be cancelled by the slow return of the rod 76 and pin 82 to their original positions due to the action of springs 77 and 78 in equalizing the pressure in chambers 70 and 72. As point 64 moves to the right the bellcrank 63 will move clockwise around its connection with link 62. Therefore, an increase in pressure in pipe 38 will produce a clockwise movement bellcrank 63 that is the sum of the movements of rods 56 and 76. Of this movement the component due to rod 56 is permanent while the component due to rod 76 is transitory.

As bellcrank 63 is moved it adjusts the output unit 52 through a link 90 that is connected at its upper end to the generally horizontal arm of the bellcrank. The unit 52 serves to produce a pressure that is proportional to the movement of link 90 and is shown in detail in Figure 3.

Figure 3:
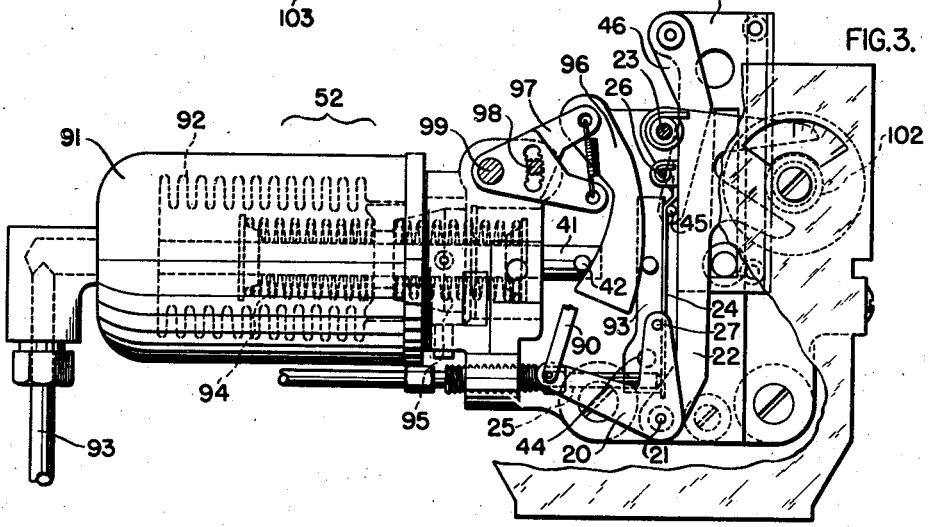
Fig. 3 is an enlarged view of a portion of the rate responsive instrument.

The output unit 52 shown in Fig. 3, is similar in many respects to the air controller shown in Fig. 4, and comprises parts 20 to 27, and 41 to 46, similar to the correspondingly designated parts of Fig. 4. The nozzle 25 of Fig. 3 is intended to receive air from a supply pipe, or be associated with a pilot valve mechanism like the pipe 31 and pilot valve mechanism 30 of Fig. 4.

The output unit 52 shown in Fig. 3 is of a type and form, also disclosed in the said Patent Number 2,125,081, which lacks the compensating provisions of the air controller shown in Fig. 4, but includes a follow-up adjustment mechanism. The follow-up mechanism 91 of Fig. 3, comprises a bellows 92 subjected externally to the controlling air pressure transmitted to the mechanism from the pilot valve by the pipe 93. The tendency of the bellows 92, resulting from its own resiliency, to maintain a constant length, is supplemented by the action of springs 94 and 95. The plunger 41 secured at one end to the movable end wall of the bellows 92, carries a projection 42 and as the bellows 92 elongates and contracts, it effects corresponding adjustments of the lever 22 through a thrust transmitting connection between the lever 22 and the plunger projection 42. The thrust connection comprises a wedge shaped thrust block 96 pivotally suspended from an adjustable support 97, and lever 43.

The wedge shaped member 96 may be shifted by adjusting a pinion member 98 to move the support 97 around its pivot 99. This adjustment serves to vary the "zero" of this unit. In other words the output pressure of the rate responsive unit 6 can be varied for a given input pressure by adjusting the member 96. This is true because the position of flapper 24 that varies the output pressure is controlled by the input pressure and the initial position of the flapper with respect to the follow-up mechanism is varied by the position of wedge member 96.

The span of this unit or amount of flapper movement to produce a full range of pressure may be varied by shifting the pin 45 up and down between levers 22 and 43 to change the leverage therebetween. This is accomplished by mounting the pin 45 on the lower end of a lever 46 that is pivoted on a member 101. The latter member is provided on one edge with rack teeth that mesh with a rotatable pinion 102. Both the pinion 102 and the pinion 98 are provided with calibrated dials, as shown in Figure 2, to indicate their adjustment.

The "span" and "zero" adjustments when taken together permit the rate control instrument to vary the total range of the output pressure for the input pressure. For example, it is usual to have these adjustments so arranged that for zero to fifteen pounds input pressure there is obtained zero to fifteen pounds output pressure. It is possible, however, to so position these adjustments that the full span of zero to fifteen pounds output pressure may be obtained for an input pressure that varies from five to ten pounds.

Air under pressure is supplied to the pilot valve unit 53 from the pipe 28 and is delivered at a regulated pressure through pipe 93 (corresponding to pipe 39 in Figure 4) to the output unit follow-up means, and through a pipe 103 (corresponding to pipe 38 in Figure 4) either to the final control unit 9 or directly to the valve positioner 10. Both the lines 28 and 103 are shown as provided with pressure gauges G so that the supply and output pressures may be noted. Other of the pipes may also be provided with pressure gauges if it is deemed necessary or desirable.

It is noted in passing that the output unit 52 of the rate responsive instrument 6 may be formed similar to the control unit shown in Figure 4 if desired. In such a case the link 90 would move the lever 20. Generally speaking it is desirable to have the reset function that is provided by the instrument shown in Figure 4, in any control system. If the primary control instrument 5 does not have the reset function, then an output unit having that function can be substituted for the unit 52 that is shown herein as having only the follow-up function.

The final control instrument 9 is indicated as being a flow controller and is preferably a "Brown flow controller" and is preferably provided with an air control unit having reset, such as is shown in Figure 4, although if desired it may be provided with an air control unit having only follow-up of the type shown in Figure 3.

In any event the instrument 9 is adapted to have its control point remotely adjusted pneumatically in a manner fully set forth in the patent of Coleman B. Moore, Patent No. 2,216,448, granted October 1, 1940. The air from the rate responsive unit is applied, as described, through the pipe 103 to a three-way valve 104, that directs the air, when in one position through the pipe 107, to the remote setting device in the instrument 9. Thus the flow controller 9 tends to maintain the supply of fuel to the furnace 1 constant as long as the temperature of the oil is constant. But when the oil temperature varies the rate responsive unit will supply air under a pressure proportional to the temperature change and its rate of change to vary the control point of the flow controller and thus vary the fuel supply in a direction to return the oil temperature toward normal. The instrument 9 applies air under varying pressure through pipes 105 and 106 to the valve positioner 10, which is a pneumatic amplifier, now in extensive commercial use, of the type shown and claimed in the patent of Coleman B. Moore, No. 2,237,038, granted April 1, 1941. The valve positioner 10 controls the air directly from supply pipe 28 to the fuel control valve 8.

At times it may be desirable to apply the varying pressure from the rate responsive instrument 9 directly to the valve positioner 10. In such a case the three-way valve 104 is adjusted to a position in which pipe 103 is connected directly to the pipe 106 instead of to the flow controller through pipe 107.

In describing the overall operation of the control system it will necessarily be treated as if the various operations take place sequentially. It must be remembered, however, that in air control systems the various pressure changes take place and the various parts move practically simultaneously. This rapid and continuous movement of the various components of the system is one of its advantages and one reason why air control systems are in such extensive use today.

In a description of the operation it is assumed that the value of the temperature, and therefore the various pressures in the system have been constant for some time and the system is in equilibrium. Assume, for example, that the oil exit temperature decreases and that this, through the instrument 5 produces an increase in pressure in pipe 38. This increased pressure will be applied through branch 38A to chamber 54 to compress bellows 55 an amount proportional to the decrease in oil temperature. This will produce a clockwise movement of bellcrank 63 and a counter-clockwise movement of member 29 in the output unit 52 (Fig. 3). Such a movement permits the flapper 24 to approach nozzle 25 and, through the pilot valve unit 53, increase the output pressure as shown by curve a in Figure 5. Simultaneously with the above the increased pressure is also applied through branch 38B to the chamber 69 to act through the liquid in chamber 70 and the lever system to move link 90 carrying pivot 64 to the right. This movement is proportional to the rate at which the pressure in pipe 38 increases. As pivot point 64 moves to the right it will increase the clockwise movement of bellcrank 63 and thereby increase the outlet pressure of the instrument as shown in Figure 6, by the curve b. In other words the control pressure in pipe 103 will be larger than that proportional to the original temperature change by an amount equal to the increase of curve b above curve a.

The amount of pressure increase due to rate of change, or the height of curve b for any given rate of change will depend upon the adjustment of pin 86. The length of time that is required to remove the increased pressure is dependent upon the adjustment of valve 80 and is generally related to the process lag. This means that the valve 80 is so adjusted that the time required for the rod 76 to return to its initial position is equal to a fraction of the time ordinarily required for the controlled variable, or oil temperature, to stabilize at a new value, when a change has occurred without the use of the rate responsive unit. The magnified response of the outlet pressure is thereby removed at a predetermined rate which is based upon rate of process change. The curves shown in Figure 5, are produced, as was explained, by an instantaneous or non-continuous change in the value of the temperature being measured. If the change is a continuing one the complete removal of the increased pressure shown by curve b would be deferred during the time that the change is taking place. Thus all the time that the temperature is away from the control point the valve will be subjected to a pressure that is the algebraic sum of that produced by the deviation of the value from the control point and the rate of its change toward or away therefrom.

If the increased pressure is applied to the control point setting mechanism of the flow controller 9 the control point will be increased more than necessary and then gradually returned to the correct point. This means that the control valve 8 will be opened wider than necessary to merely compensate for the temperature change by an amount proportional to the rate of temperature change and will be closed as the temperature returns to normal. If the increased pressure in pipe 103 had been applied directly to the valve positioner the action of valve 8 would have been the same except that the flow of the fuel would not have been taken into consideration. In either event the action on the valve 8 is practically instantaneous and the oil exit temperature is rapidly returned to normal without the occurrence of hunting or cycling.

From the above it will be seen that the rate response instrument or pneumatic relay 6 is a complete unit in and of itself that may be as readily installed in existing control installations as it may in new ones. The instrument is useful in any process where the lag is large or the rate of change of the condition is great. The various adjustments provided in the instrument permit it to be readily adapted to even the most complex control systems with an improvement of the control characteristics thereof.

Another advantage that may be obtained by the use of the rate response instrument of this invention is what amounts to a shifting of the throttling range of the system in an anticipating direction. As above explained the instrument can be so adjusted that the output pressure may vary from zero to fifteen pounds while the input pressure is varying from five to ten pounds. Such operation is produced as a result of a given movement of the link 90 when the output unit is properly adjusted. Since the link 90 receives its movement from unit 50 in linear proportion to the value of the condition being measured and from unit 51 in proportion to the rate of change of the condition, the movement of the link for any significant rate of change is the result of two components. The compound movement of link 90 is sufficient to cause operation of the unit 51 prior to the time it would operate from its linear component, therefore, the output pressure is changed earlier than it would be without the rate response component. This early change in effect shifts the throttling range in an anticipating direction and effectively brings the value of the condition to the control point without hunting.

It is noted that a plurality of the rate responsive instruments may be used in series to produce a control of the second or higher power derivative.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. A rate responsive air control instrument operative to set up an air pressure including a first unit responsive to the value of a condition and adapted to insert a permanent component in said air pressure, a second unit responsive to the rate of change of said condition and adapted to insert a transitory component in said air pressure and including an adjustment to vary the size of the transitory component for a given rate of change and an adjustment to vary the length of time said transitory component is inserted in said air pressure, and a third unit which is jointly operated by said first two units, a source of fluid under pressure adjusted by said third unit, said third unit including an adjustment to shift the zero point of the adjusted air pressure and an adjustment to vary the span of the adjusted air pressure for a given adjustment of said third unit.

2. A rate responsive air control instrument operative to set up an air pressure including a first unit responsive to the value of a condition and adapted to insert a permanent component in said air pressure, a second unit responsive to the rate of change of said condition and adapted to insert a transitory component in said air pressure, and a third unit which is jointly operated by said first two units, a source of fluid under pressure adjusted by said third unit, said third unit including means to shift the zero point of the adjusted air pressure, and an adjustment to vary the span of the adjusted air pressure for a given adjustment of said third unit.

HARRY S. JONES.